(12) United States Patent
Taylor

(10) Patent No.: US 7,308,569 B2
(45) Date of Patent: Dec. 11, 2007

(54) METHOD AND SYSTEM FOR SPECIFYING THE BOOT ORDER OF MASS STORAGE DEVICES IN A COMPUTER SYSTEM

(75) Inventor: Duane S. Taylor, Blackburg, VA (US)

(73) Assignee: American Megatrends, Inc., Norcross, GA (US)

( * ) Notice: Subject to any disclaimer, the term of this patent is extended or adjusted under 35 U.S.C. 154(b) by 494 days.

(21) Appl. No.: 10/632,648

(22) Filed: Aug. 1, 2003

(65) Prior Publication Data

US 2005/0038985 A1 Feb. 17, 2005

(51) Int. Cl.
G06F 9/00 (2006.01)
G06F 1/24 (2006.01)
(52) U.S. Cl. .............. 713/2; 713/1; 713/100
(58) Field of Classification Search ............ 713/1, 713/2, 100
See application file for complete search history.

(56) References Cited

U.S. PATENT DOCUMENTS

| | | | |
|---|---|---|---|
| 6,292,890 B1 | 9/2001 | Crisan | |
| 6,356,965 B1 * | 3/2002 | Broyles et al. | 710/104 |
| 6,553,432 B1 * | 4/2003 | Critz et al. | 710/10 |
| 6,721,883 B1 * | 4/2004 | Khatri et al. | 713/2 |
| 6,754,817 B2 | 6/2004 | Khatri et al. | |
| 6,792,556 B1 | 9/2004 | Dennis | |
| 6,988,194 B2 * | 1/2006 | Nunn et al. | 713/2 |
| 6,990,685 B1 | 1/2006 | Christensen et al. | |
| 2002/0133695 A1 | 9/2002 | Khatri et al. | |
| 2003/0084307 A1 * | 5/2003 | Schwartz | 713/189 |
| 2003/0229819 A1 * | 12/2003 | Kodama | 714/5 |
| 2003/0233535 A1 * | 12/2003 | Nunn et al. | 713/1 |
| 2004/0078679 A1 * | 4/2004 | Cagle et al. | 714/36 |
| 2004/0215949 A1 * | 10/2004 | Dennis et al. | 713/1 |

* cited by examiner

Primary Examiner—A. Elamin
(74) Attorney, Agent, or Firm—Hope Baldauff Hartman, LLC

(57) ABSTRACT

Methods for specifying a boot order for two or more mass storage devices within a computer system are provided. According to one method, a single user interface menu is provided through which the boot order for the computer system may be specified by arranging in order identifiers corresponding to each of the mass storage devices. An initial program load of the computer is then attempted from the mass storage devices in the order specified utilizing the single user interface menu. In another operational mode, a boot order may be specified for two or more mass storage devices within a computer system by determining for each mass storage device type whether more than one mass storage device exists within the computer system. For each mass storage device type for which more than one mass storage device exists, a device type menu is provided including menu items corresponding to each of the mass storage devices of the device type. The menu items of each device type menu are orderable to specify the boot order for devices of the device type. A boot order menu is also provided including one or more menu items comprising either a menu item corresponding to a mass storage device type wherein more than one device of the device type exists or menu item corresponding to the mass storage device for each of the mass storage device types for which only one device of the type exists. The menu items of the boot order menu are orderable to specify the boot order for the computer system.

13 Claims, 10 Drawing Sheets

METHOD AND SYSTEM FOR SPECIFYING THE BOOT ORDER OF MASS STORAGE DEVICES IN A COMPUTER SYSTEM

TECHNICAL FIELD

Embodiments of the invention relate generally to the field of computer basic input/output systems. More particularly, embodiments of the invention relate to the field of specifying the boot order of mass storage devices within a computer system through a basic input/output system.

BACKGROUND OF THE INVENTION

Many desktop and server computer systems utilize a basic input/output system ("BIOS") to control various aspects of the computer system. In particular, the BIOS is utilized to initialize the various hardware components within the computer system, to provide an interface between an operating system executing on the computer system and the hardware, and to perform other various functions. In many computer systems, the BIOS also provides a user interface for configuring various aspects of the computer hardware. For instance, a setup menu may be provided by the BIOS in response to the selection of a predefined keyboard key by a user. Through the setup menu, a user can define various configuration options and performance features of the computer system.

One group of variables typically configurable through the setup menu of a computer system is the boot order of mass storage devices attached to the computer system. In particular, because modern computer systems may include multiple devices capable of storing an operating system from which the computer system may be booted, a user is permitted to select the order in which an attempt is made to boot the computer from the various devices. For instance, a user may specify that an attempt be made to boot the computer system from a floppy disk drive prior to attempting to boot the computer system from a hard disk drive. If the computer cannot be booted from the floppy disk drive, an attempt will be made to boot the computer from the hard disk drive. Any number of such devices may be specified in the boot order.

The BIOS contained in many computer systems utilizes a standard setup layout for specifying boot priority. According to this standard setup layout, the bootable devices within the computer system are categorized by type. Once the devices have been categorized by type, three separate drive menus are presented. One menu is presented for hard disk drives, one menu is presented for removable disk drives, and one menu is presented for optical disk drives, such as CD-ROM drives. In addition to the three drive menus, an initial program load ("IPL") menu is also provided that lists the three available drive types as well as any bootable devices that are not mass storage drives, such as boot entry vector ("BEV") devices.

Utilizing the standard setup layout, boot order priority is chosen by first setting boot priorities in each of the three separate drive menus and then by setting an overall boot priority in the main IPL menu. For example, overall boot order might be established as removable disk drives, then hard disk drives, and then optical disk drives. In this scenario, if there were two drives of each type, an attempt would be made first to boot the removable devices in the order specified in the removable drive type menu, then an attempt would be made to boot from the hard disk devices in the order specified in the hard disk drive type menu, and finally an attempt would be made to boot the optical devices in the order specified in the optical disk drive type menu.

Although the standard setup layout for specifying drive priority has been widely used, there are several problems with this user interface. The first problem is a lack of flexibility in setting drive boot priority. In particular, creating an arbitrary boot priority order is impossible utilizing the standard setup layout. For example, in the scenario described above, it would be impossible to set an arbitrary boot order that interleaved devices of the various device types. Another problem that occurs with the standard setup layout is that the drive type menus are often presented even though they are redundant. This occurs, for instance, when there is only one drive of a type. In this case, the drive menu for that type is redundant as the drive could be listed directly in the main IPL menu.

It is with respect to these considerations and others that the various embodiments of the present invention have been made.

SUMMARY OF THE INVENTION

In accordance with the present invention, the above and other problems are solved by methods for specifying a boot order for mass storage devices contained within a computer system. The methods for specifying a boot order allow any mass storage device to be given any boot priority, and mass storage devices of different types may be freely interspersed in the boot priority order. Moreover, the various methods provided herein are operative to eliminate any redundant menus that would appear utilizing the standard setup layout for specifying boot priority. Utilizing aspects of the present invention, the type menu corresponding to the storage device is not displayed if there is only one mass storage device of a particular type, and the actual name of the device appears directly in the IPL menu.

According to one aspect of the invention, a method is provided for specifying a boot order for two or more mass storage devices within a computer system. According to the method, a single user interface menu is provided through which the boot order for all of the mass storage devices in the computer system may be specified. The boot order may be specified by arranging identifiers corresponding to each of the mass storage devices within the computer system in the desired order. Once the boot priority order has been specified, an attempt is made to boot the computer system from the mass storage devices in the specified order. According to this aspect of the invention, each of the mass storage devices in the computer system may be of a different type, and the mass storage devices may be arranged within the single user interface menu in any order regardless of the device type. For instance, mass storage device types such as fixed disk mass storage devices, removable media mass storage devices, and optical disk mass storage devices, may be arranged in any order within the single user interface menu and the resulting boot order.

According to another aspect of the invention, a method is provided for specifying a boot order for two or more mass storage devices within a computer system, wherein each of the mass storage devices may be of a different device type. For instance, each of the mass storage devices may be a fixed disk mass storage device, a removable media mass storage device, or an optical disk mass storage device. According to the method, a determination is made for each of the mass storage device types as to whether more than one mass storage device exists within the computer system of the particular device type. For each of the device types for which more than one mass storage device exists within the computer system, a device type menu is provided. The device type menu includes menu items corresponding to each of the mass storage devices within the computer system of the device type. Moreover, the menu items of each device type menu are orderable to specify the boot order for the devices of the particular device type.

According to this aspect of the invention, a boot order menu is also provided that includes one or more menu items. The menu items of the boot order menu may be either a menu item corresponding to a mass storage device type wherein more than one device of the device type exists. A menu item of the boot order menu may also correspond to an actual mass storage device for each of the mass storage device types for which only one device of the device type exists within the computer. In this manner, a device type menu is not provided for device types for which only one device exists within the computer system. The menu items of the boot order menu are orderable to specify the boot order for the computer system. Once the menu items of the boot order menu have been ordered, an attempt may be made to boot the computer system from the mass storage devices in the order specified by the menu items of the boot order menu.

According to yet another aspect of the invention, a computer BIOS is provided that is operative to permit the boot order of the mass storage devices within the computer system to be specified in one of two possible modes of operation. Utilizing the first mode of operation, referred to herein as "flexboot", a single user interface menu is provided through which the boot order for the computer system may be specified. In particular, the boot order for the computer system may be specified by arranging in order identifiers corresponding to each of the mass storage devices within the computer system.

Alternatively, the boot order of the mass storage devices within the computer system may be specified in a second mode of operation, referred to herein as "autoflex." Utilizing the second mode of operation, a determination is made for each of the mass storage device types as to whether more than one mass storage device exists of the device type within the computer system. For each of the mass storage device types for which more than one mass storage device exists, a device type menu is provided. Through the device type menu, the boot priority order for devices of the device type may be specified.

A boot order menu is also provided that includes menu items of one of two types. Menu items may correspond to a mass storage device type wherein more than one device of the device type exists within the computer system or to a menu item corresponding to a mass storage device for each of the mass storage device types for which only one device of the type exists within the computer system. The menu items of the boot order menu are orderable to specify the boot order for the computer system. Once the menu items have been specified, an attempt may be made to boot the computer system from the mass storage devices in the order specified by the boot order menu. A user or computer system integrator may specify whether the boot priority order may be specified utilizing the first mode of operation or the second mode of operation.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computer system and encoding a computer program of instructions for executing a computer process.

These and various other features as well as advantages, which characterize the present invention, will be apparent from a reading of the following detailed description and a review of the associated drawings.

DETAILED DESCRIPTION OF AN ILLUSTRATIVE EMBODIMENT

As described briefly above, embodiments of the present invention provide methods and systems for specifying the boot order of mass storage devices within a computer system. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
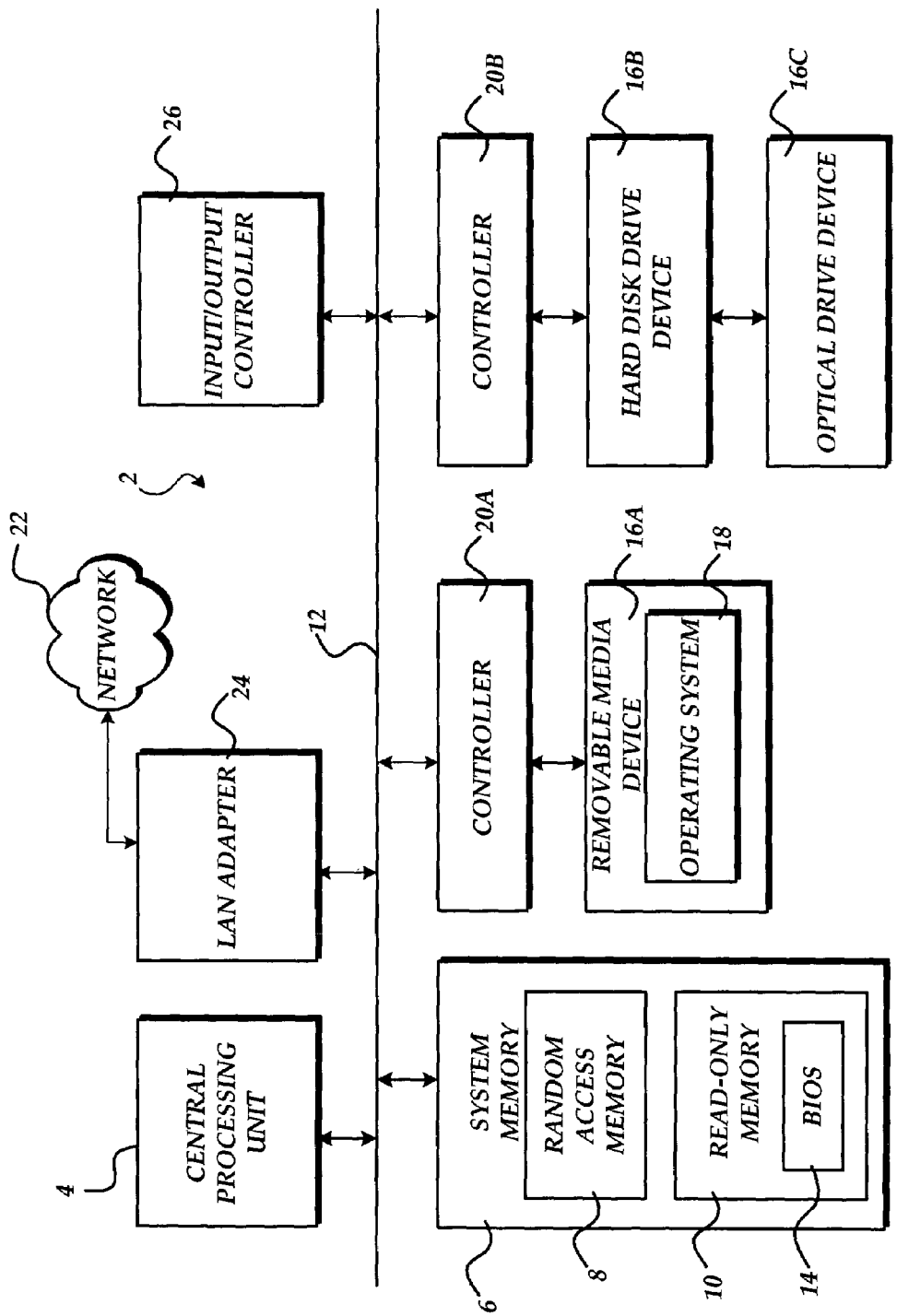
FIG. 1 is a computer architecture diagram illustrating various aspects of the hardware and software architecture of a computer utilized in the various embodiments of the invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of a basic input/output system that operates to control the operation of a personal or server computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer 2 for practicing the various embodiments of the invention will be described. The computer architecture shown in FIG. 1 illustrates a conventional server or personal computer, including a central processing unit 4 ("CPU"), a system memory 6, including a random access memory 8 ("RAM") and a read-only memory ("ROM") 10, and a system bus 12 that couples the memory to the CPU 4. A basic input/output system 14 ("BIOS") containing the basic routines that help to transfer information between elements within the computer 2, such as during startup, is stored in the ROM 10. As discussed above, the BIOS 14 may include a setup program that includes functionality for specifying the boot order of mass storage devices connected to the computer 2.

The computer illustrated in FIG. 1 further includes one or more mass storage devices. For instance, the computer 2 may include mass storage devices of different types, such as a removable media device 16A, a hard disk drive device 16B (also referred to as a fixed disk device), or an optical drive device 16C, such as a CD-ROM or DVD-ROM. As known to those skilled in the art, mass storage devices may be configured for storing an operating system 18 suitable for controlling the operation of a networked computer, such as the WINDOWS NT or XP operating systems from MICROSOFT CORPORATION of Redmond, Wash. The computer 2 may utilize devices containing an operating system 18 to "boot" the computer 2. As known to those skilled in the art, "booting" the computer 2 is the process of loading the operating system 18 into the system memory 6 and executing the operating system 18. "Booting" the computer 2, or performing a "boot" of the computer 2, may also be referred to herein as an initial program load ("IPL").

The mass storage devices are connected to the CPU 4 through a mass storage controller connected to the bus 12. For instance, the removable media device 16A is connected to the bus 12 through the controller 20A. The hard disk drive device 16B and the optical drive device 16C are connected to the bus 12 through the controller 20B. The mass storage devices and their associated computer-readable media, provide non-volatile storage for the computer 2.

Although the description of computer-readable media contained herein refers to a mass storage device, such as a hard disk or CD-ROM drive, it should be appreciated by those skilled in the art that computer-readable media can be any available media that can be accessed by the computer illustrated in FIG. 1. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should be included within the scope of computer-readable media. Computer-readable media may also be referred to as a computer program product.

According to various embodiments of the invention, the computer illustrated in FIG. 1 may operate in a networked environment using logical connections to remote computers through a network 22, such as the Internet or a LAN. The computer 2 may connect to the network 22 through a LAN adapter 24 connected to the bus 12. It should be appreciated that the LAN adapter 24 may also be utilized to connect to other types of networks and remote computer systems. The computer may also include an input/output controller 26 for receiving and processing input from a number of devices, including a keyboard, mouse, or electronic stylus (not shown in FIG. 4). An input/output controller may also provide output to a display screen, a printer, or other type of output device.

Figure 2:
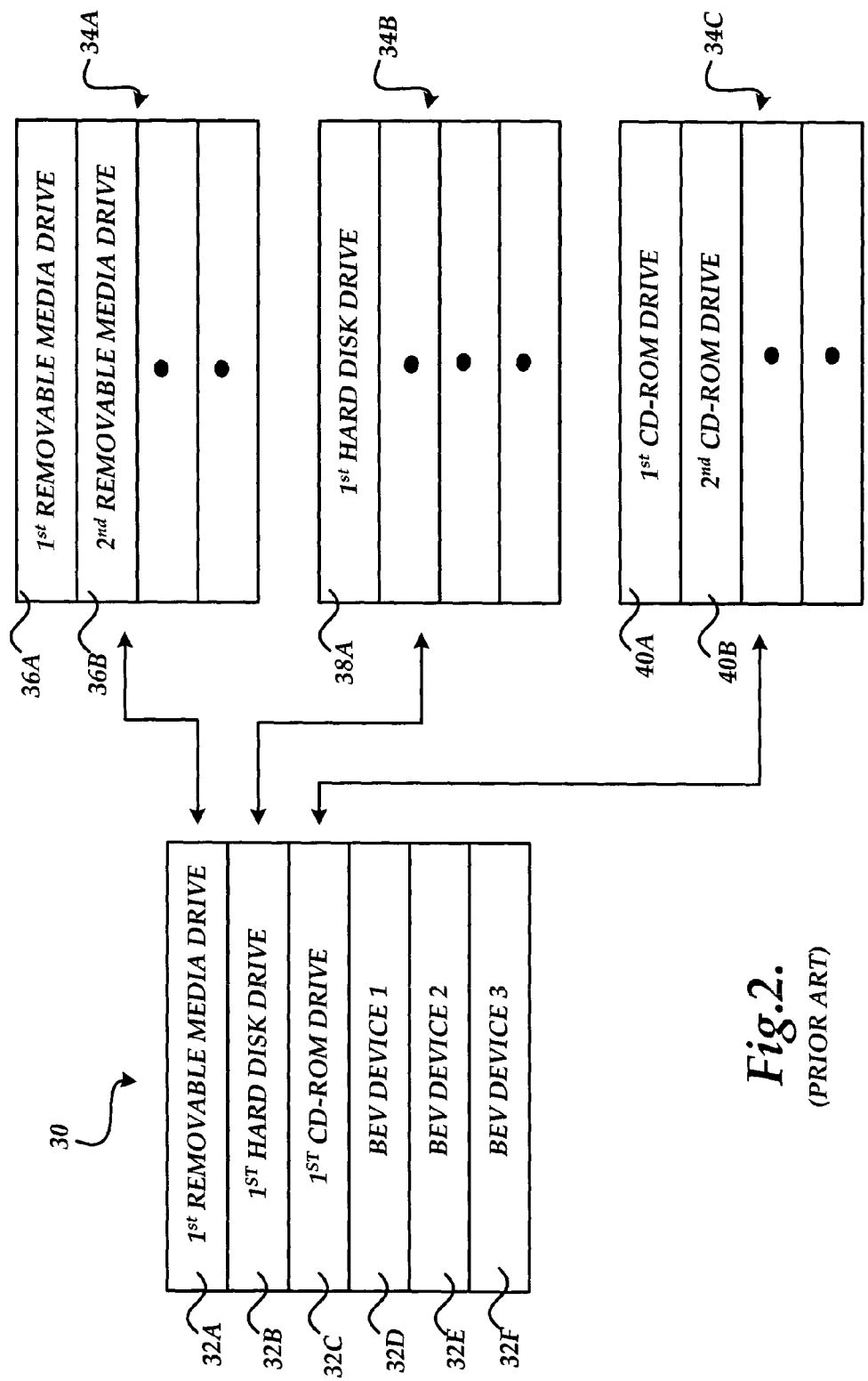
FIG. 2 is a user interface diagram illustrating a menu structure provided by a prior art system for specifying the boot priority of the mass storage devices within a computer system.

Referring now to FIG. 2, a prior art system for specifying a boot order for the mass storage devices operating within a computer system will be described. As shown in FIG. 2, the standard setup layout for specifying boot priority includes an IPL menu 30 and three device type menus 34A-34C. As discussed briefly above, these menus are provided to a user by the BIOS of a computer system and displayed in response to a user request to specify the boot priority for the computer system. In operation, the IPL menu 30 includes a number of menu items 32A-32F. The menu items 32A-32F may be arranged in order by a user to specify the boot priority of each of the mass storage devices within the computer system. The item 32A may also be utilized to access the device type menu 34A. Through the device type menu 34A, the priority of each of the removable drives contained in the computer system may be arranged utilizing the menu items 36A-36B. Similarly, the menu item 32B in the IPL menu 30 may be utilized to access the device type menu 34B. Utilizing the menu item 38A, the priority for each of the hard disk drive devices in the system may be specified. Likewise, using the menu item 32C, the device type menu 34C may be accessed. The menu items 40A-40B in the device type menu 34C may be utilized to specify the priority of each of the optical disk drives within the computer system. The IPL menu 30 also includes menu items 32D-32F for specifying the boot priority of other types of devices within the computer system, such as BEV devices.

Utilizing the IPL menu 30, a user can specify the order in which the various types of devices within the computer system may be booted. For instance, in the example shown in FIG. 2, removable media drives are booted first, hard disk drives are booted second, and then optical disk drives are booted third. The particular device of a given device type specified by the particular device having the highest priority in each of the device type menus 34A-34C is attempted first. Accordingly, the boot order as specified by the illustrative user interface shown in FIG. 2 comprises the first removable media drive, the first hard disk drive, the first CD-ROM drive, BEV device 1, BEV device 2, and BEV device 3.

As discussed briefly above, the user interface illustrated in FIG. 2 suffers from a number of serious drawbacks which make this user interface undesirable. In particular, creating an arbitrary boot priority order is impossible using the standard setup layout shown in FIG. 2. For example, utilizing this user interface, it is impossible to set an arbitrary boot order that interleaves devices of the various types. For instance, utilizing the user interface shown in FIG. 2, it is impossible to boot first from a removable media drive, second from a hard disk drive, third from another removable media drive, and fourth from another hard disk drive. Moreover, the device type menus 34A-34C are often presented by the user interface shown in FIG. 2 even though there is only a single device of a given device type. For instance, as shown in FIG. 2, the device type menu 34B would be presented to a user upon the selection of the menu item 32B even though only a single menu item 38A is shown in the menu 34B corresponding to the first hard disk drive. Accordingly, redundant menus are presented to a user and additional steps are required to configure the boot priority utilizing the prior art system shown and illustrated in FIG. 2. The various embodiments of the invention address these and other shortcomings of this prior art system.

Figure 3:
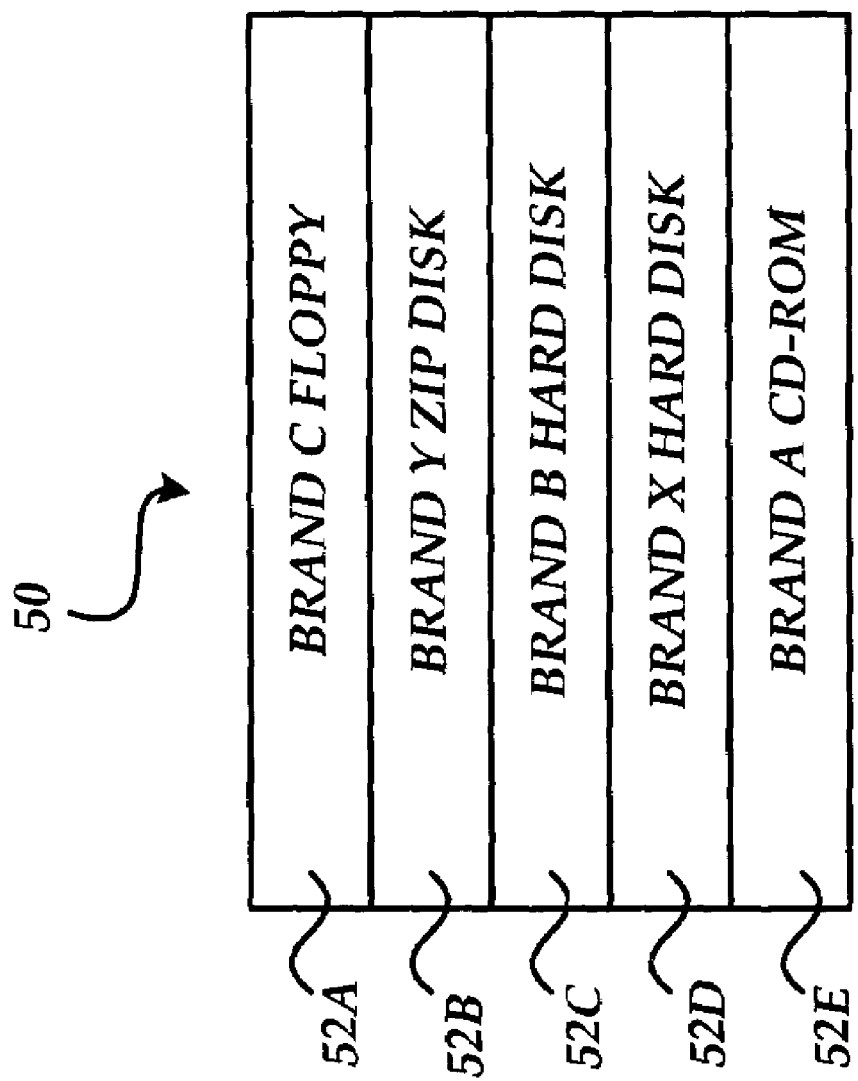
FIG. 3 is a user interface diagram illustrating a menu structure for specifying the boot priority of devices within a computer system according to one embodiment of the invention.

Referring now to FIG. 3, an illustrative user interface provided by one embodiment of the invention for specifying a boot order priority for two or more mass storage devices will be described. As shown in FIG. 3, a boot order menu 50 is provided. The boot order menu 50 is displayed by the BIOS 14 in response to a user request to specify the boot order priority of each of the mass storage devices 16A-16C within a computer system.

The boot order menu 50 includes a number of menu items 52A-52E. The menu items 52A-52E identify each of the mass storage devices contained within the computer system 2. For instance, as shown in the illustrative boot order menu 50 illustrated in FIG. 3, the menu item 52A corresponds to a floppy disk drive, the item 52B corresponds to a ZIP disk drive, the item 52C corresponds to a hard disk drive, the item 52D corresponds to another hard disk drive, and the item 52E corresponds to a CD-ROM drive. Each of the menu items 52-A-52E may be arranged in order to specify the boot priority for each of the mass storage devices within the computer system 2. Once the user has specified the boot priority of the computer system 2 by arranging the menu items 52A-52E, an attempt may be made to boot the computer system from the mass storage devices in the order specified by the user.

It should be appreciated that the menu items 52A-52E of the boot order menu 50 may be utilized to specify an arbitrary order for any of the mass storage devices connected to a computer system regardless of the device type. In this manner, an arbitrary order may be created for the boot priority of the computer system 2 and drives of any type being interleaved in any possible order. In this manner, fixed disk mass storage devices, removable media mass storage devices, and optical disk mass storage devices may be booted in any order specified by a user. Moreover, it should also be appreciated that the identifiers utilized in the boot order menu items 52A-52E may comprise device names for each of the mass storage devices. These devices may be obtained by querying the individual devices for such an identifier. The identifier may then be displayed in the boot order menu items 52A-52C.

Figure 4:
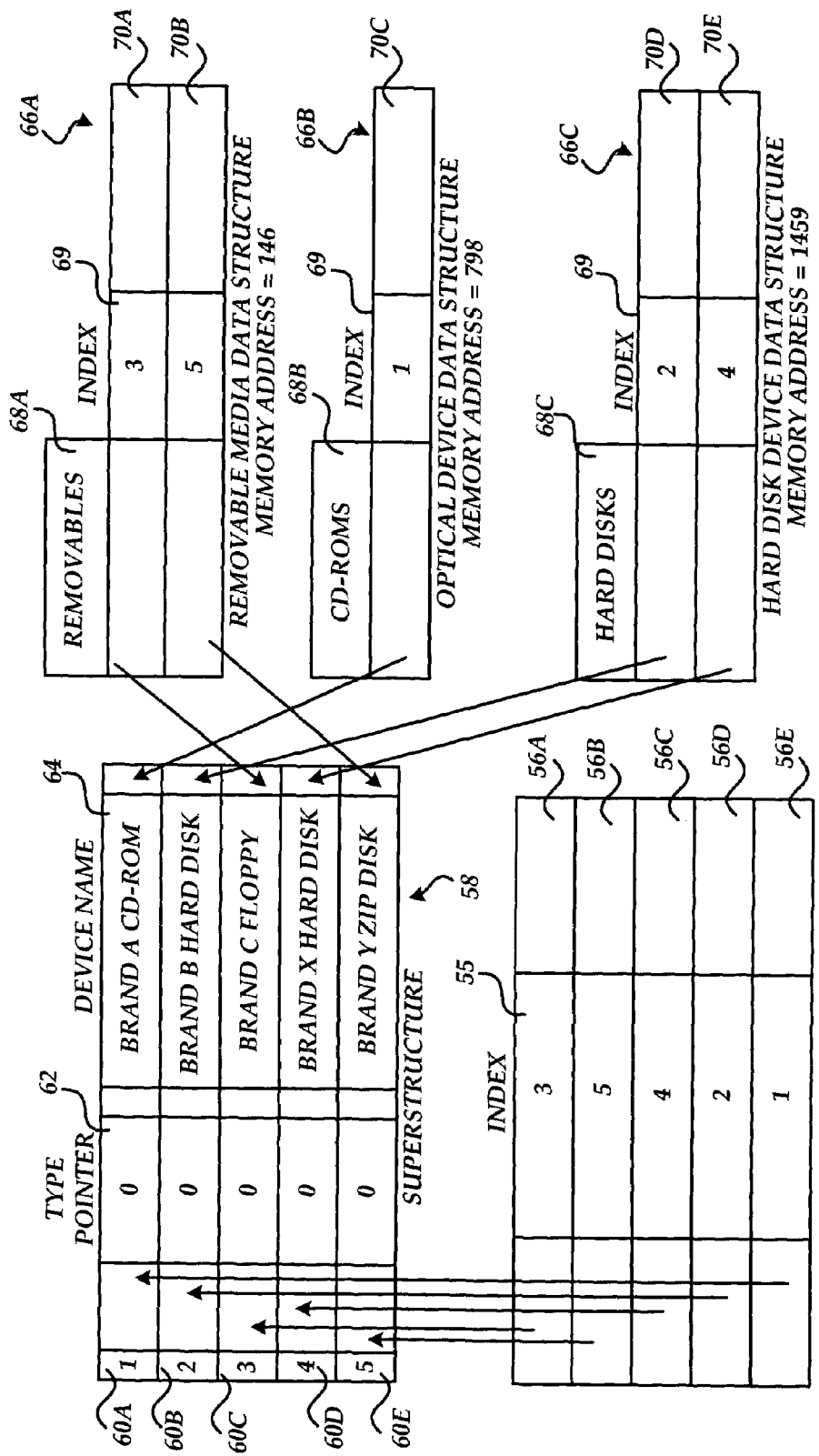
FIG. 4 is a data structure diagram illustrating various data structures utilized in one embodiment of the invention.

Referring now to FIG. 4, a number of data structures will be illustrated that are utilized by the BIOS 14 to provide the boot order menu 50 discussed above with respect to FIG. 3. In particular, a data structure 58, referred to herein as the "superstructure," identifies each of the mass storage devices contained within the computer 2 that may be utilized to perform an initial program load. The contents of the superstructure 58 include one or more entries 60A-60E. Each of the entries 60A-60E identifies a mass storage device contained within the computer 2. The order of the entries 60A-60E is determined by the order of discovery of each of the mass storage devices within the computer system. Therefore, the order of the entries 60A-60E within the data structure 58 may change considerably when devices are added to or removed from the computer 2.

The super structure 58 includes a type pointer field 62 for each of the entries 60A-60E. The type pointer field 62 is utilized to determine where the identifier displayed in each of the menu items 52A-52E is obtained from. In particular, in the example shown in FIG. 4, each of the values of the type pointer field 62 for the entry 60A-60E are set to zero. Zero indicates that the device name column 64 should be utilized to obtain the name displayed in each of the menu items 52A-52E. The device name field 64 includes the actual device name as obtained from the mass storage device itself. For instance, the entry 60A includes the device name "Brand A CD-ROM." As will be discussed in greater detail below, an entry may be provided in the type pointer field 62 for each entry 60A-60E that points to a field in a device type data structure for displaying a generic moniker in one of the menu items 52A-52E.

The embodiments of the invention also utilize several device type data structures 66A-66C. Each of the device type data structure 66A-66C corresponds to a particular type of mass storage device. For instance, the device type data structure 66A corresponds to removable media devices, the device type data structure 66B corresponds to optical devices, and the device type data structure 66C is utilized for hard disk devices. Each of the device type data structures 66A-66C include entries corresponding to each of the devices of the particular device type contained within the computer 2. For instance, the device type data structure 66A includes entries 70A and 70B corresponding to the two removable devices within the computer system. Similarly, the device type data structure 66B includes one entry 70C corresponding to the one removable mass storage device contained within the system. Likewise, the device type data structure 66C includes two entries 70D-70E corresponding to the two fixed disk devices contained within the computer 2. Each of the entries 70A-70E and the device type data structures 66A-66C include an index field 69. The index field 69 for each of the entries comprises a pointer into the superstructure 58. In this manner, the data for each of the devices referenced by the entries 70A-70E may be easily obtained from the superstructure 58. S will be described in greater detail below, the contents of each of the device type data structures 66A-66C may be utilized to provide device type menus for each of the mass storage device types.

As illustrated in FIG. 4, the device type data structures 66A-66C are not symmetrical. Rather, a moniker field 68A-68C is provided in each of the device type data structures 66A-66C that identifies a generic name to be displayed for the class of mass storage devices. For instance, the moniker field 68A includes the phrase "removables" for the removable media devices, the moniker field 68B includes the generic phrase "CD-ROMS" for the optical device data structure, and the moniker field 68C includes the generic phrase "hard disks" for the hard disk device data structure 66C. When a generic moniker should be displayed as one of the menu items 52A-52E, an entry in the type pointer field 62 points to the contents of the respective moniker fields 68A-68C.

As shown in FIG. 4, an IPL data structure 54 is also utilized. The IPL data structure 54 includes entries 56A-56E corresponding to each of the mass storage devices contained within the computer 2 from which an initial program load may be made. The order of the entries in the IPL data structure 54 determines the boot order priority of the computer 2. The order of the entries in the data structure 54 are set by a user by rearranging the order of the entries 52A-52E utilizing the boot order menu 50, described above with respect to FIG. 3.

Each of the entries 56A-56E in the IPL data structure 54 comprises a pointer back to the super structure 58. By referencing the pointer into the superstructure 58, information regarding each of the devices identified in the IPL data structure 54 may be obtained. Moreover, by following the pointer back into the superstructure 58 and utilizing the contents of the type pointer field 62, the display name to be included in each of the menu items 52A-52E in the boot order menu 50 may be determined. In the example shown in FIG. 4, each of the values of the type pointer field 62 is set to zero. Accordingly, when the boot order menu 50 is displayed, the contents of the device name field 64 corresponding to each of the entries 60A-60E are displayed. In this manner, the actual display name for each of the mass storage devices contained within the computer 2 may be displayed in the menu 50.

Figure 5:
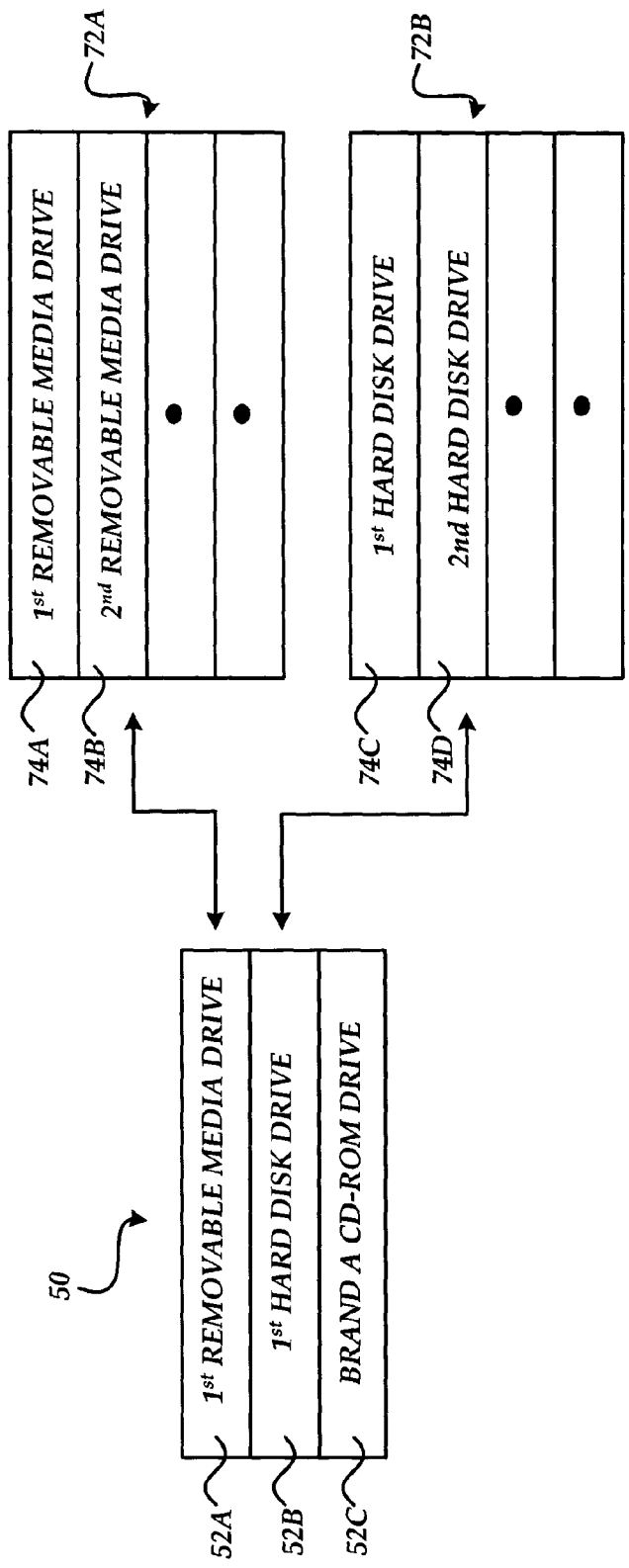
FIG. 5 is a user interface diagram illustrating a menu structure for specifying the boot priority of mass storage devices provided by one embodiment of the invention.

Referring now to FIG. 5, a user interface for specifying the boot priority of drives within a computer system according to another embodiment of the invention will be described. As shown in FIG. 5, a boot order menu 50 is provided that includes entries 52A-52C. The entries 52A and 52B may be utilized by a user to access the device type menus 72A and 72B, respectively. However, where only a single device of a particular device type exists within the computer system, an entry 52C is made in the boot order menu 50 corresponding directly to that device. Accordingly, as shown in FIG. 5, the entries 52A and 52B include identifiers corresponding to mass storage device types while the entry 52C corresponds to a particular mass storage device. Redundant menus are eliminated by listing the mass storage device directly in the boot order menu 50 and not providing a separate device type menu for a device that is the only one of a type.

As discussed above, a user may utilize the entries 52A-52C to specify the boot order of the computer 2. In particular, the entries 52A-52C may be rearranged in any order. Additionally, the entries 52A and 52B may be selected to access the device type menus 72A-72B, respectively. The entries 74A-74B may be arranged within the device type menu 72A to identify the priority of the removable media drives. Likewise, the entries 74C-74D may be rearranged within the device type menu 72B to specify the respective priorities of the hard disk devices contained within the computer 2. In the example shown in FIG. 5, the boot priority would be as follows: the first removable media drive, the first hard disk drive, and finally, the "Brand A CD-ROM."

Figure 6:
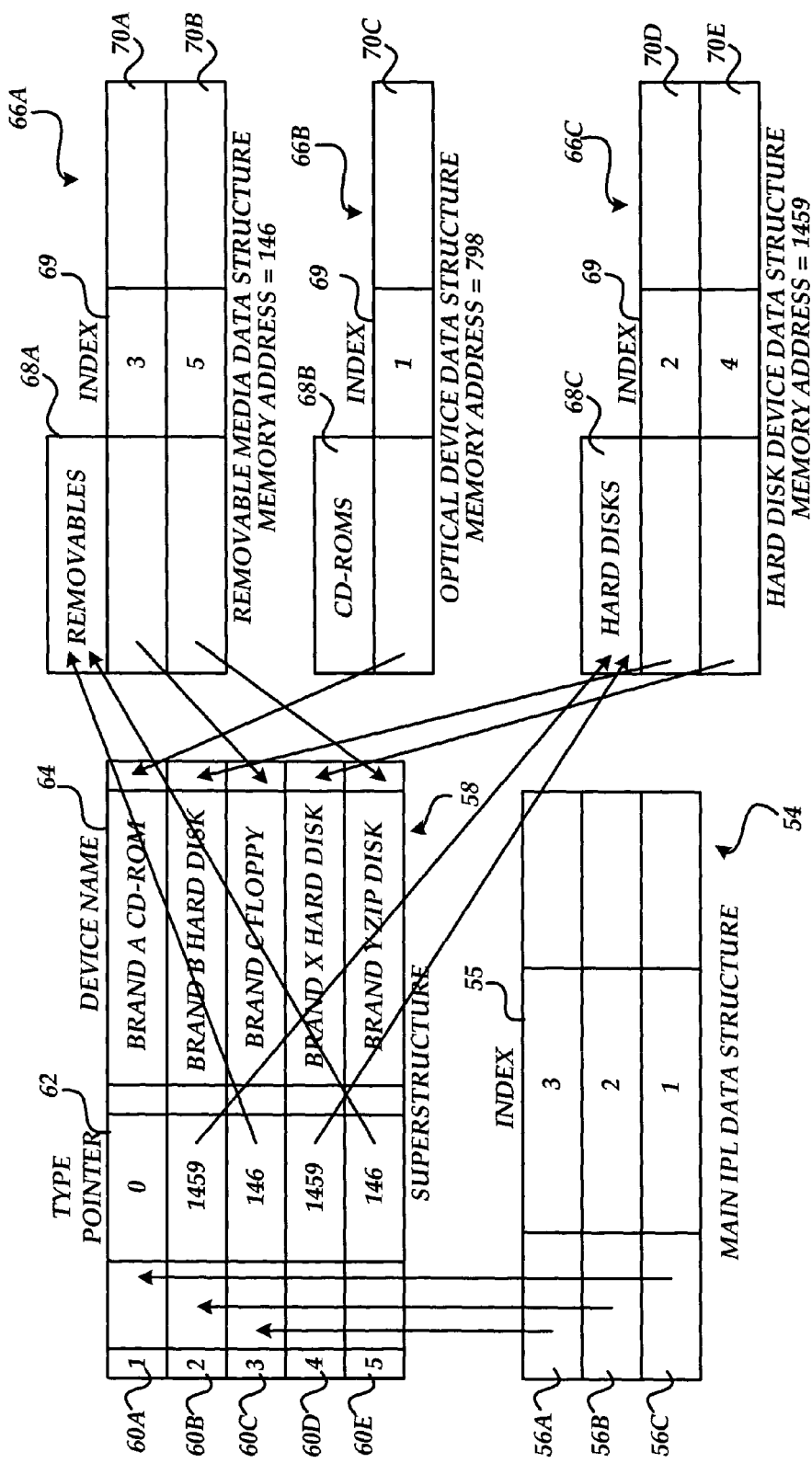
FIG. 6 is a data structure diagram illustrating the data structures utilized in one embodiment of the invention.

Referring now to FIG. 6, additional details regarding the use of the various data structures described herein for providing the user interface shown in FIG. 5 will be described. As discussed above with respect to FIG. 4, the boot order for the computer 2 is specified using the boot order menu 50. In particular, the boot order menu 50 specifies the contents of the IPL data structure 54. Each of the entries 56A-56C within the IPL data structure 54 include an index field 55. The index field 55 includes a pointer into the super structure 58 for each of the devices included in the boot priority. In order to determine the name to be displayed for each of the entries 52A-52C in the boot order menu 50, a pointer to each of the entries 56A-56C is followed back into the superstructure 58. The corresponding value of the type pointer field 62 is then referenced to determine the display name. Because only a single device exists for the optical device type, the value of the type pointer field 62 for the entry 60A is set to zero. Accordingly, the value in the device name field 64 for the entry 60A is utilized to display the entry 52C in the boot order menu 50 shown in FIG. 5. Additionally, because only a single optical drive exists, the device type data structure 66B is not utilized to display a device type menu.

In order to determine the display name shown in the menu items 52A-52B, the respective pointers contained in the IPL data structure 54 are followed back into the superstructure 58. For the hard disk drive, the value of the type pointer 62 for the entry 60B points to the field 68C contained in the device type data structure 66C. Accordingly, the contents of the moniker field 68C are utilized to display the name of the entry 52B. Similarly, the value of the type pointer field 62 for the entry 60C points to the moniker field 68A. Accordingly, the value of this field is utilized to provide the display name for the entry 52A in the menu 50.

It should be appreciated that other types of data structures other than those shown in FIGS. 4 and 6 may be utilized to provide the functionality described herein. Moreover, it should be appreciated that the contents of the various data structures shown in and described above with reference to FIGS. 4 and 6 are merely illustrative. It should be appreciated that the contents of these data structures will vary according to the number and type of each of the mass storage devices contained within the computer 2.

Figure 7:
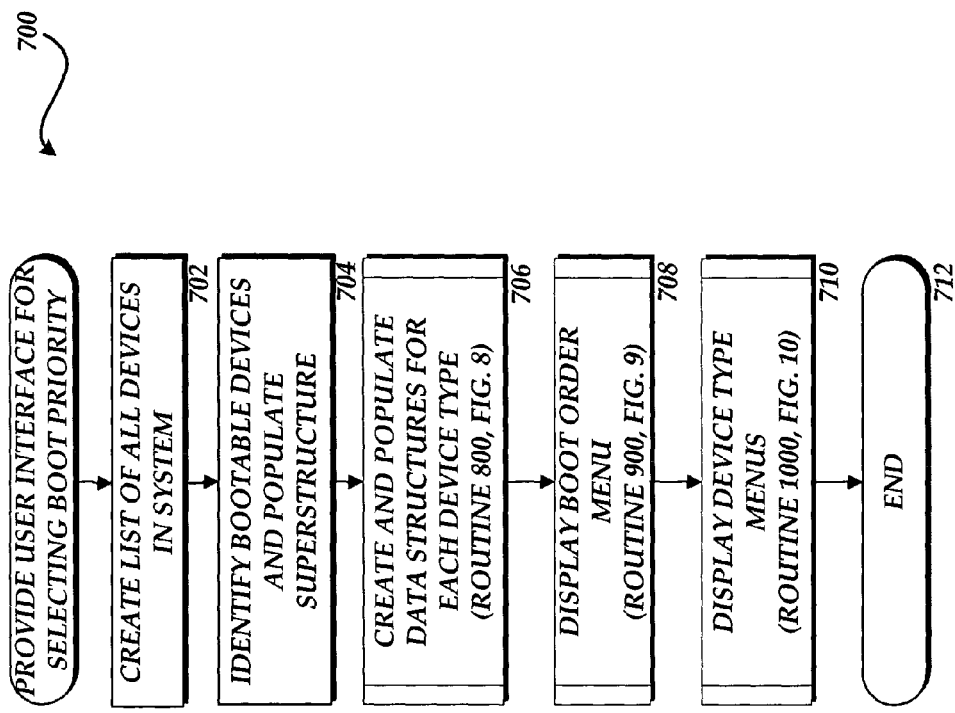
FIGS. 7-10 are flow diagrams illustrating various aspects of the operation of a method for specifying the boot order of mass storage devices within a computer system according to the various embodiments of the invention.

Referring now to FIG. 7, an illustrative routine 700 will be described for providing a user interface for selecting a boot priority for one or more mass storage devices within a computer system. The routine 700 begins at block 702, where the BIOS 14 creates a list of all the devices within the computer 2. The routine 700 then continues to block 704, where the BIOS identifies devices that may be utilized to perform an initial program load. As the bootable devices are identified, entries 60A-60E are made in the superstructure 58 corresponding to the bootable devices. Once all of the bootable devices have been identified and a corresponding entry has been made in the superstructure 58, the routine 700 continues to block 706.

At block 706, the contents of each of the device type data structures 66A-66C are populated. In particular, the superstructure 58 is parsed to identify devices of each of the respective device types. Entries are then made in the respective device type data structures and pointers are created referring back to the appropriate entry in the superstructure 58. Additionally, the IPL data structure 54 is populated. Once the device type data structure 66A-66C and the IPL data structure 54 have been populated, the routine 700 continues to block 708. An illustrative routine 800 is described below with respect to FIG. 8 for creating and populating the device type and IPL data structures.

At block 708, the boot order menu 50 is displayed. Typically, the boot order menu 50 is displayed in response to a user request through the set up facilities of the BIOS to modify the boot priority order for the computer 2. An illustrative routine 900 is described below with reference to FIG. 9 for displaying the boot order menu. The routine 700 then continues to block 710, where each of the device type menus 72A-72B are displayed, if necessary. Input is received from a user directed to the boot order menu 50 and the device type menus 72A-72B and the contents of the IPL data structure 54 are modified accordingly. An illustrative routine 1000 is described below for displaying the device type menus. The routine 700 then continues to block 712, where it ends.

Figure 8:
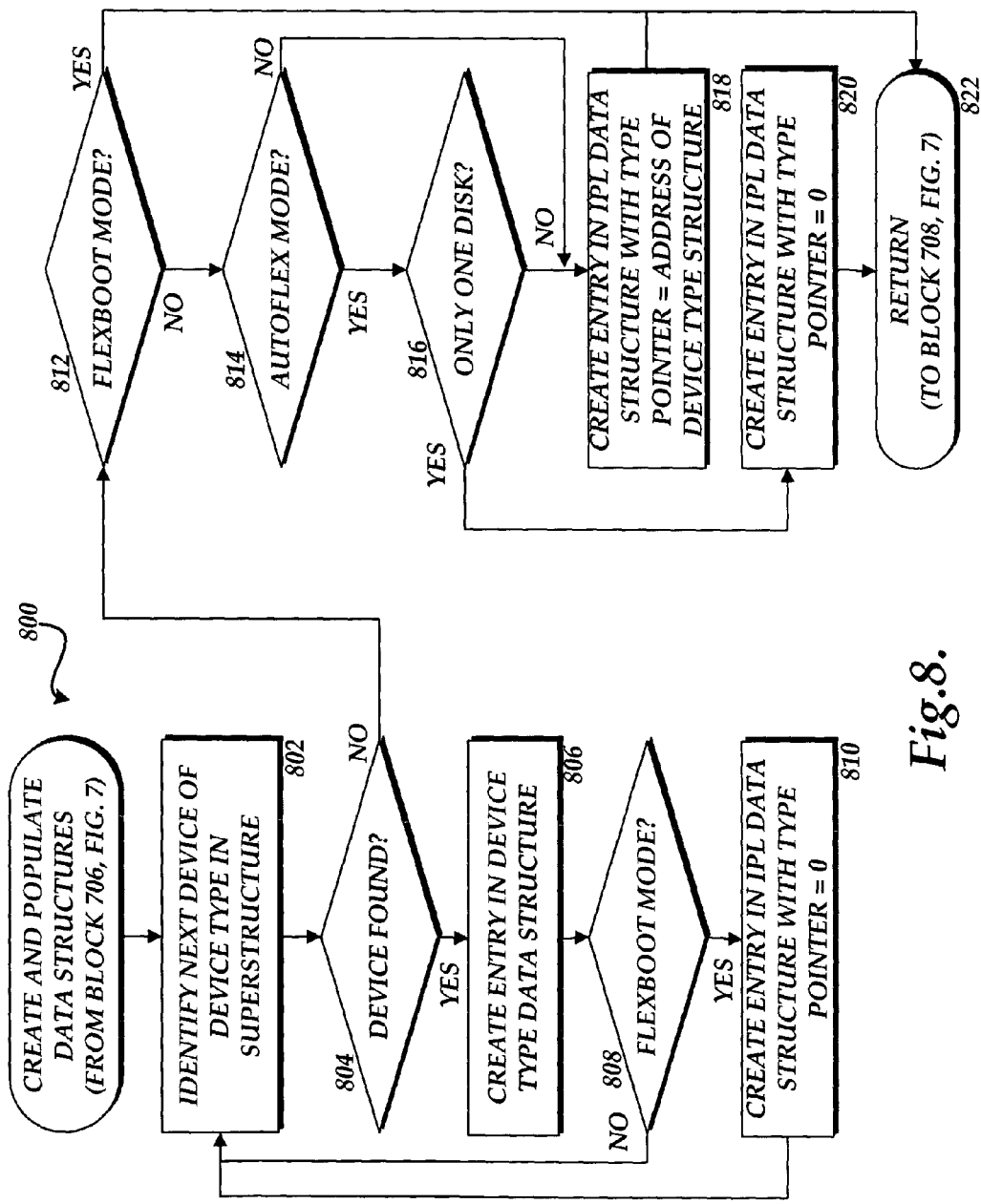

Referring now to FIG. 8, an illustrative routine 800 for creating and populating the data structures utilized in the various embodiments of the invention will be described. It should be appreciated that the routine 800 is executed multiple times, each execution corresponding to one of the device type data structures 66A-66C. Accordingly, the embodiment of the invention described herein the routine 800 is executed once for the removable media devices, once for the optical devices, and once for the hard disk devices contained within a computer system.

The routine 800 begins at block 802, where the next device contained within the superstructure 58 of the particular device type is identified. For instance, if the device type data structure 66A is being populated, the next removable device in the superstructure 58 will be identified. From block 802, the routine 800 continues to block 804, where a determination as to whether a next device of the particular device type was located within the superstructure 58. If no additional devices were found, the routine 800 branches to block 812. However, if a device was located in the superstructure 58, the routine 800 continues to block 806.

At block 806, an entry is created in the respective device type data structure. For instance, if a removable drive was located in the superstructure 58, a corresponding entry would be created in the device type data structure 66A. The routine 800 then continues to block 808, where a determination is made as to whether the computer 2 is operating in "flexboot" mode. As discussed briefly above, "flexboot" mode provides the user interface shown in FIG. 3 whereby a single user interface menu is provided through which the boot order for the computer system may be specified by arranging in order the identifiers corresponding to each of the mass storage devices. If the computer is not operating in "flexboot," the routine 800 branches back to block 802 where the next device of the particular device type is identified. If, however, the computer 2 is operating in "flexboot" mode, the routine 800 continue from block 808 to block 810, where an entry is created in the IPL data structure 54 corresponding to the device identified in the superstructure 58. Moreover, because each of the entries 52A-52E utilized in the boot order menu 50 utilizes an actual device name when operating in "flexboot" mode, the type pointer field 62 in the entry 60 in the superstructure 58 corresponding to the current device is set to zero. As described above, by setting this entry to zero, the device name displayed in the boot order menu 50 is retrieved from the device name field 64. From block 810, the routine 800 returns to block 802, where the next device of the particular type is located in the superstructure 58.

If, at block 804, it is determined that another device of the particular device type was not located within the superstructure 58, the routine 800 branches to block 812. At block 812, a determination is made as to whether the computer 2 is operating in "flexboot" mode. If the computer is operating in "flexboot" mode, no additional steps need to be taken to populate the IPL data structure 54. Accordingly, the routine branches from block 812 to block 822, where it returns to block 708, shown in and described above with respect to FIG. 7. However, if the computer 2 is not operating in "flexboot" mode, the routine 812 continues to block 814.

At block 814, a determination is made as to whether the computer 2 is operating in "autoflex" mode. As discussed briefly above, "autoflex" mode comprises the mode wherein the user interface shown in and described above with respect to FIG. 5 is provided. Using this interface, a boot order menu 50 is provided that includes menu items for each device when only one device of the device type exists and menu items corresponding to device types when more than one device of a particular type exists. If the computer is not operating in "autoflex" mode, the routine 800 branches to block 818, where an entry is created in the IPL data structure 54 for the current device and wherein an entry is created in the appropriate type pointer field 62 setting the value of this field to the address of the appropriate device type data structure 66A-66C. In this manner, when neither "flexboot" nor "autoflex" mode is in operation, each of the device type data structures 66A-66C may be utilized and displayed regardless of the number of devices of the particular device type. From block 818, the routine 800 continues to block 822, where it returns.

If, at block 814, it is determined that "autoflex" mode is currently being utilized, the routine 800 continues to block 816. At block 816, a determination is made as to whether only one device of the particular mass storage device type exists. If more than one disk exists, the routine 800 continues to block 818 where an entry is created in the IPL data structure 54 for the device and wherein an entry is made in the appropriate type pointer field 62 including the address of the appropriate device type structure 66A-66C. In this manner, if more than one disk exists, a generic moniker will be displayed in the boot order menu 50 for the particular device type and the appropriate device type data structure 66A-66C will be utilized to display the appropriate device type menu 72A-72B. If, however, only one disk exists, the routine 800 branches to block 820, where an entry is created in the IPL data structure 54 corresponding to the device and an entry is made in the appropriate type pointer field 62 setting the value of this field to zero. In this manner, the name specified in the appropriate device name field 64 will be utilized in the boot order menu 50 where there is a single device of the particular device type. From blocks 818 and 820, the routine 800 continues to block 822, where it returns.

Figure 9:
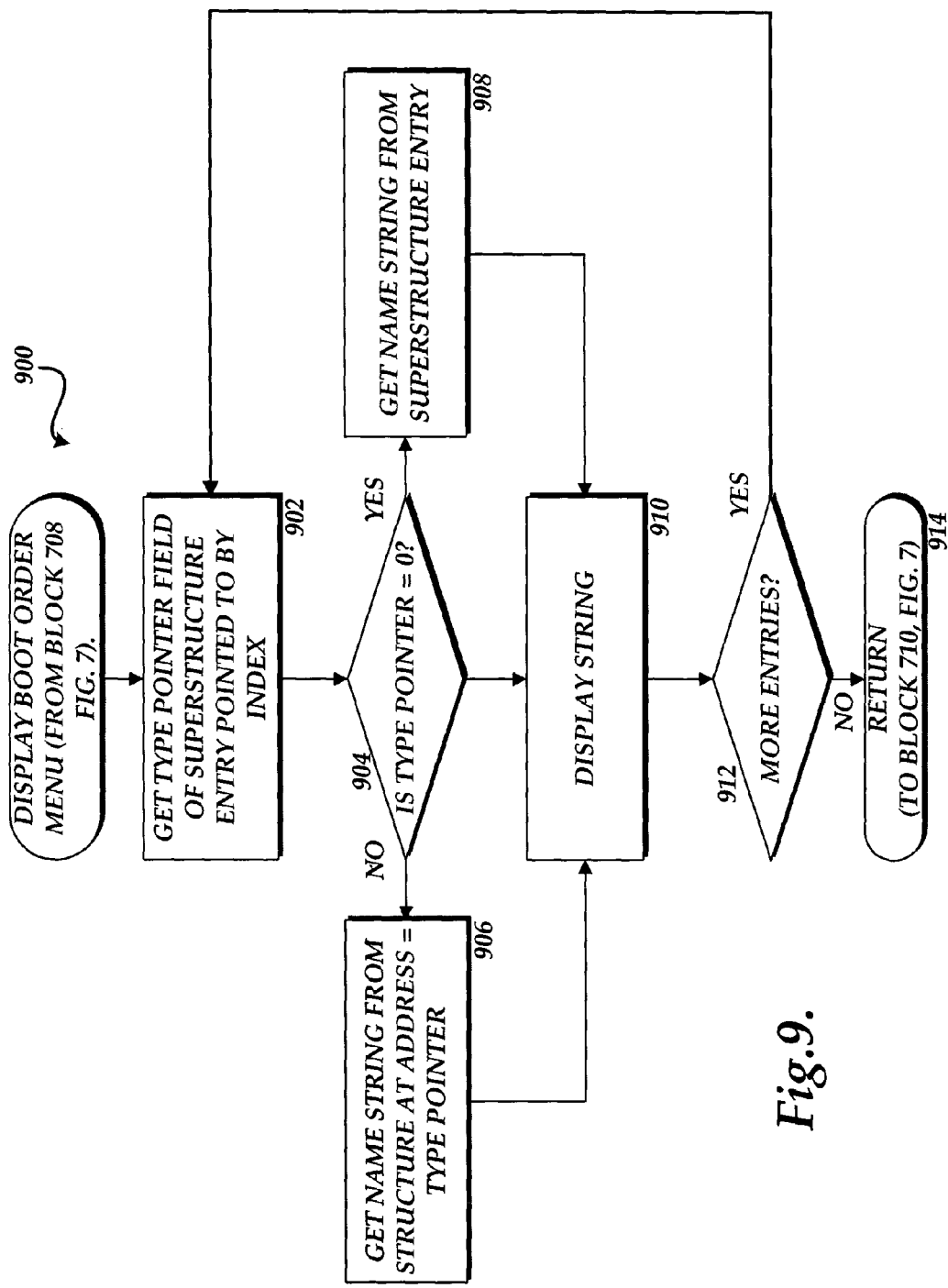

Referring now to FIG. 9, an illustrative routine 900 will be described for displaying the boot order menu 50. The routine 900 begins at block 902, where the value of the type pointer field 62 for the first entry in the IPL data structure 54 is obtained. The routine 900 then continues to block 904, where a determination is made as to whether the value of the type pointer field 62 is equal to zero. If the value of the type pointer field is equal to zero, the routine 900 branches to block 908, where the name string for the current entry in the boot order menu 50 is obtained from the corresponding value in the superstructure 58. In particular, the name is obtained from the device name field 64. If the value of the type pointer is not equal to zero, the routine 900 branches from block 904 to block 906 where the name string is obtained from the data structure located at the address specified by the value of the particular type pointer field 62. As discussed above, the value of the type pointer field 62 points into a data location within one of the device type data structures 66A-66C containing a generic moniker to be displayed within the particular entry of the boot order menu.

From blocks 906 and 908, the routine 900 continues to block 910, where the obtained string is displayed in the particular entry in the boot order menu 50. The routine 900 then continues to block 912, where a determination is made as to whether more entries exist within the boot order menu 50 to be displayed. If additional entries exist, the routine 900 branches back to block 902, where the type pointer field value for the next entry in the IPL data structure 54 is retrieved. If no additional entries exist in the IPL data structure 54, the routine 900 continues to block 914, where it returns to block 710, shown in and described above with respect to FIG. 7.

Figure 10:
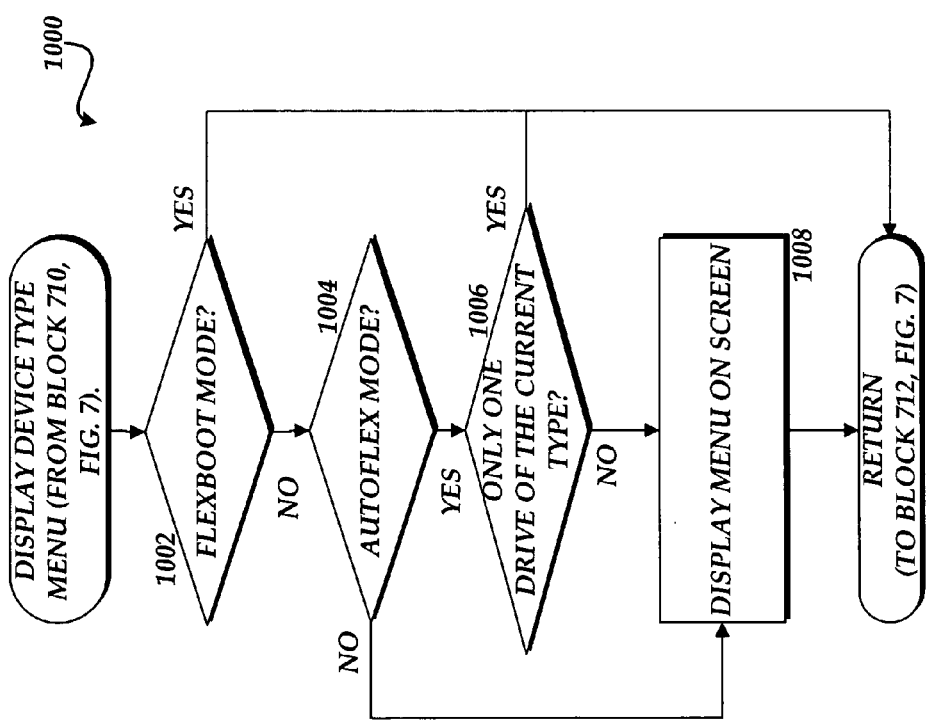

Referring now to FIG. 10, an illustrative routine 1000 will be described illustrating a process of displaying the device type menus 72A-72B. It should be appreciated that the routine 1000 is executed respectively for each of the device type menus 72A-72B to display these menus to a user. The routine 1000 begins at block 1002, where a determination is made as to whether the computer 2 is operating in the "flexboot" mode. If the computer 2 is operating in the "flexboot" mode, the device type menus 72A-72B are not displayed. Accordingly, the routine 1000 branches to block 1010 in the event that "flexboot" mode is in operation.

If "flexboot" mode is not currently in operation, the routine 1000 continues to block 1004. At block 1004, a determination is made as to whether the computer 2 is operating in the "autoflex" mode. If the computer is not operating in the "autoflex" mode, the routine 1000 branches from block 1004 to block 1008, where the appropriate device type menus 72A-72B are displayed to a user in a conventional fashion. Because the "autoflex" mode is not in operation, the device type menus 72A-72B will be displayed to the user even if only a single device of the particular device type exists. From block 1008, the routine 1000 continues to block 1010, where it returns to block 712 and ends.

If, however, the computer 2 is operating in the "autoflex" mode, the routine 1000 continues from block 1004 to block 1006. At block 1006, a determination is made as to whether only one drive of the current device type exists within the computer 2. If only one device of the current device type exists, there is no need to display a device type menu 72A-72B for the device. Accordingly, the routine 1000 branches to block 1010 in the event that only one drive of the current device type exists. If more than one device of the current device type exists, the routine 1000 continues from block 1006 to block 1008 where the appropriate device type menu 72A-72B is displayed. From block 1008, the routine 1000 continues to block 1010, where it returns to block 712, illustrated in and described above with respect to FIG. 7.

Based on the foregoing, it should be appreciated that the various embodiments of the invention provide methods and systems for specifying the boot priority of a computer system. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for specifying a boot order for a plurality of mass storage devices within a computer system, each of the plurality of mass storage devices being a one of one or more mass storage device types, the method comprising:

determining for each of the plurality of mass storage device types whether more than one mass storage device exists within the computer system;

providing a boot order menu including one or more menu items comprising a menu item corresponding to a mass storage device type for which more than one device of the device type exists, the menu item corresponding to a mass storage device type being included in the boot order menu responsive to determining that more than one mass storage device exists for the mass storage device type, the menu items of the boot order menu being orderable to specify the boot order for the computer system;

providing a device type menu for at least one of the menu items of the boot order menu corresponding to the mass storage device types for which more than one mass storage device exists within the computer system, the device type menu including entries corresponding to each of the mass storage devices of the device type, and the entries of the device type menu being orderable to specify the boot order for each of the mass storage devices of the device type; and attempting to boot the computer system from the plurality of mass storage devices in the order specified by the boot order menu.

2. The method of claim 1, wherein the menu items of the boot order menu corresponding to a mass storage device comprise device names obtained from the plurality of mass storage devices.

3. The method of claim 2, wherein the menu items of the boot order menu corresponding to a mass storage device type comprise a moniker generically describing the mass storage device type.

4. The method of claim 3, wherein the mass storage device types comprise fixed disk mass storage devices, removable media mass storage devices, and optical disk mass storage devices.

5. The method of claim 4, wherein the computer system further comprises a basic input/output system (BIOS), wherein the device type menus and the boot order menu are provided by the BIOS, and wherein the BIOS is operative to attempt to boot the computer system from the mass storage devices in the specified order.

6. A computer storage medium having computer-executable instructions stored thereon, said instructions operative to provide the method of claim 1 when executed by a computer.

7. A computer-controlled apparatus operative to perform the method of claim 1.

8. The method of claim 1, wherein the menu items further comprise a menu item corresponding to a mass storage device for each of the mass storage device types for which only one device of the type exists within the computer system.

9. A method for specifying a boot order for a plurality of mass storage devices within a computer system, each of the plurality of mass storage devices being a one of one or more mass storage device types, the method comprising:

providing a computer BIOS operative to permit the boot order of the mass storage devices to be specified in one of two possible modes of operation, wherein the first mode of operation comprises, providing a single user interface menu through which the boot order for the computer system may be specified by arranging in order identifiers corresponding to each of the plurality of mass storage devices, and attempting to boot the computer system from the plurality of mass storage devices in the specified order;

and wherein the second mode of operation comprises, determining for each of the plurality of mass storage device types whether more than one mass storage device exists within the computer system, providing a boot order menu including one or more menu items comprising a menu item corresponding to a mass storage device type for which more than one device of the device type exists, the menu item corresponding to a mass storage device type being included in the boot order menu responsive to determining that more than one mass storage device exists for the mass storage device type, the menu items of the boot order menu being orderable to specify the boot order for the computer system;

providing a device type menu for at least one of the menu items of the boot order menu corresponding to the mass storage device types for which more than one mass storage device exists within the computer system, the device type menu including entries corresponding to each of the mass storage devices of the device type, and the entries of the device type menu being orderable to specify the boot order for each of the mass storage devices of the device type, and attempting to boot the computer system from the plurality of mass storage devices in the order specified by the boot order menu.

10. The method of claim 9, wherein the boot order of the mass storage devices within the computer system may be specified in either the first mode of operation or the second mode of operation depending upon a user made selection.

11. A computer storage medium having computer-executable instructions stored thereon, the instructions operative to provide the method of claim 9 when executed by a computer.

12. A computer-controlled apparatus operative to perform the method of claim 9.

13. The method of claim 9, wherein the menu items further comprise a menu item corresponding to a mass storage device for each of the mass storage device types for which only one device of the type exists within the computer system.

* * * * *